(12) United States Patent
Dike et al.

(10) Patent No.: US 10,214,301 B2
(45) Date of Patent: Feb. 26, 2019

(54) AUTOMATED CONTROL SYSTEM FOR MANUFACTURING AIRCRAFT

(71) Applicant: The Boeing Company, Chicago, IL (US)

(72) Inventors: Bruce Alan Dike, Issaquah, WA (US); Robert William Dost, Kent, WA (US); Brian Harry Cartwright, Gig Harbor, WA (US); Joseph A. Gagnier, Port Ludlow, WA (US); William A. Rauch, Puyallup, WA (US); Amanda Frances Chastain, Huntsville, AL (US); James Francis Callow, III, Maple Valley, WA (US)

(73) Assignee: The Boeing Company, Chicago, IL (US)

( * ) Notice: Subject to any disclaimer, the term of this patent is extended or adjusted under 35 U.S.C. 154(b) by 272 days.

(21) Appl. No.: 15/151,537

(22) Filed: May 11, 2016

(65) Prior Publication Data

US 2017/0327247 A1 Nov. 16, 2017

(51) Int. Cl.
*B64F 5/40* (2017.01)
*G06Q 50/06* (2012.01)
*G05B 19/418* (2006.01)

(52) U.S. Cl.
CPC .......... *B64F 5/40* (2017.01); *G05B 19/41865* (2013.01); *G06Q 50/06* (2013.01); *G05B 2219/31053* (2013.01); *G05B 2219/31449* (2013.01); *G05B 2219/45067* (2013.01)

(58) Field of Classification Search
CPC ................ B64F 5/40; G05B 19/41865; G05B 2219/31449; G05B 2219/45067
See application file for complete search history.

(56) References Cited

U.S. PATENT DOCUMENTS

| | | | |
|---|---|---|---|
| 6,445,968 B1* | 9/2002 | Jalla | G06Q 10/10 700/101 |
| 6,609,100 B2* | 8/2003 | Smith | G06Q 10/06 705/7.23 |
| 8,935,286 B1* | 1/2015 | Westerman, Jr. | G06Q 10/087 705/28 |
| 9,870,444 B2* | 1/2018 | Senesac | G06F 17/5095 |
| 9,925,625 B2* | 3/2018 | Turner | B23P 15/00 |
| 2001/0032103 A1* | 10/2001 | Sinex | G06Q 10/025 705/4 |
| 2007/0050225 A1* | 3/2007 | Leslie | G06Q 10/06 705/7.21 |
| 2011/0172795 A1 | 7/2011 | Hansen et al. | |
| 2012/0050287 A1* | 3/2012 | Grose | G06Q 10/06 345/420 |
| 2013/0132146 A1* | 5/2013 | Pye | G06Q 10/06 705/7.22 |

(Continued)

*Primary Examiner* — Ronald D Hartman, Jr.
(74) *Attorney, Agent, or Firm* — Yee & Associates, P.C.

(57) ABSTRACT

A method and apparatus for manufacturing a product. The method comprises creating a product plan comprising time units during which manufacturing of the product occurs, wherein the time units are grouped into phases of the manufacturing. Further, the product plan also includes entities performing work on systems for the product and work items performed by the entities during the manufacturing days. The manufacturing of the product is controlled using the product plan.

29 Claims, 12 Drawing Sheets

(56) References Cited

U.S. PATENT DOCUMENTS

| | | | |
|---|---|---|---|
| 2013/0144679 A1* | 6/2013 | Burnett | G06Q 10/0631 |
| | | | 705/7.27 |
| 2014/0222492 A1* | 8/2014 | Furbeck | G06Q 10/06316 |
| | | | 705/7.26 |
| 2014/0236651 A1* | 8/2014 | Sherer | G06Q 10/0631 |
| | | | 705/7.13 |
| 2015/0242782 A1* | 8/2015 | Onions | G06O 10/06313 |
| | | | 705/7.23 |
| 2016/0180281 A1* | 6/2016 | Cailliau | G06Q 10/063118 |
| | | | 705/7.17 |

\* cited by examiner

AUTOMATED CONTROL SYSTEM FOR MANUFACTURING AIRCRAFT

BACKGROUND INFORMATION

1. Field

The present disclosure relates generally to an improved product manufacturing system and, in particular, to a method and apparatus for manufacturing an aircraft using a dynamic product plan.

2. Background

Manufacturing products, such as aircraft, is a complex process. Manufacturing aircraft involves the fabrication and assembly of many parts. The parts for a commercial airplane may number from hundreds of thousands of parts to millions of parts. The parts are assembled to form subassemblies and assemblies for different systems in the aircraft. Systems in an aircraft include, for example, a hydraulic system, a wiring system, an in-flight entertainment system, a hydraulics system, avionics, an environmental control system, a propulsion system, a flight control surface system, a communications system, an airframe, and other suitable systems in aircraft.

Manufacturing of the aircraft involves different phases. These phases include a customer order, specifications and requirements, design, procurement, fabrication, installation, assembly, rollout, and delivery. In manufacturing the aircraft, many tasks are performed during these different phases. The tasks may be performed in parallel. Often times, the tasks are dependent on the completion of other tasks. These tasks are also referred to as work items. In this illustrative example, a work item is one or more steps or operations that are performed to generate a result. For example, a work item may comprise operations performed to create a design for a part, manufacture a part, assemble parts to form an assembly, certify a part, order a part, or other operations that are performed to generate a result in manufacturing an aircraft or other product. Further, the work items may be organized into workflows.

The performance of the items in the workflows involves parts, materials, labor, approvals, inspections, and other items that are applied to the production of the aircraft. Many of these work items within workflows may be performed in parallel to manufacture the aircraft. Further, some work items are dependent on the performance of the work items with the same workflow, another workflow, or some combination thereof. With the different dependencies, changes to one work item may affect other work items within the same workflow and may affect other workflows being performed in parallel to manufacture the aircraft.

Reducing the time needed to manufacture the aircraft is desirable to increase the throughput in a manufacturing system. Reducing the time needed to manufacture the aircraft involves greater synchronization of vendors, manufacturing facilities, design teams, supply chains, and other components that provide parts, materials, assemblies, and labor for manufacturing the aircraft.

Producing a plan to manufacture the aircraft that takes into account all of these different factors is a complex and difficult proposition when taking into account all of the different items that go into the plan. Currently used project management systems do not provide an ability to easily view and see information in a plan of the size needed to encompass manufacturing an aircraft. Further, taking into account of how changes in one part of the plan affect other parts is a complex undertaking that may take more time and effort than desired with currently used project management systems.

Therefore, it would be desirable to have a method and apparatus that take into account at least some of the issues discussed above, as well as other possible issues. For example, it would be desirable to have a method and apparatus that overcome a technical problem with managing the manufacturing of an aircraft.

SUMMARY

An embodiment of the present disclosure provides a product management system. The product management system comprises a product plan and a product manager in a computer system. The product plan comprises time units during which manufacturing of a product occurs, wherein the time units are grouped into phases of the manufacturing. Further, the product plan comprises entities performing work on systems for the product. Yet further, the product plan comprises work items performed by the entities during the time units. The product manager controls the manufacturing of the product using the product plan.

Another embodiment of the present disclosure provides a method for manufacturing a product. The method comprises creating a product plan comprising time units during which manufacturing of the product occurs, wherein the time units are grouped into phases of the manufacturing. Further, the product plan also includes entities performing work on systems for the product and work items performed by the entities during the time units. The manufacturing of the product is controlled using the product plan.

Yet another embodiment of the present disclosure provides a product management system. The product management system comprises a manufacturing system, a product plan, a display system, and a product manager in a computer system. The product plan comprises manufacturing days during which manufacturing of a product occurs, wherein the manufacturing days are grouped into phases of the manufacturing. Further, the product plan further comprises work items performed by the entities during the manufacturing days, dependencies between the work items, and workflows identifying an order in which the work items are performed. The product manager controls the manufacturing of the product by the manufacturing system using the product plan. Further, the product manager displays a product workflow map on the display system. Still further, the product manager changes the product plan when performance information about the manufacturing of the product received during the manufacturing of the product affects timing of the workflows. Still yet further, the product manager displays an updated product workflow map when the product plan is changed during the manufacturing of the product.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that visualizing a product plan for manufacturing aircraft is desirable in managing the manufacturing of aircraft. The illustrative embodiments recognize and take into account that currently used project management systems are often unable to take into account the complexities of workflows, schedules, work items, materials, parts, vendors, supply chains, design teams, manufacturing teams, and other components that are involved in the manufacturing of the aircraft.

The illustrative embodiments recognize and take into account that a product plan may be created by a management team in charge of the manufacturing of the aircraft. However, work items in a plan may not occur as planned. As a result, changes to the product plan may occur soon after the creation of the product plan. The illustrative embodiments recognize and take into account that changes to the product plan typically continue to occur during the manufacturing of the aircraft. The illustrative embodiments recognize and take into account that the changes to the production plan often take much more time and effort than desired to take into account dependencies between workflows and work items within workflows.

Thus, the illustrative embodiments provide a method and apparatus for manufacturing a product. In one illustrative example, a product management system includes a product plan and a product manager. The product plan comprises manufacturing days during which manufacturing of a product occurs, wherein the manufacturing days are grouped into phases of manufacturing; entities performing work on systems for the product; and work items performed by the entities during the manufacturing days. The product manager is located in a computer system, wherein the product manager controls the manufacturing of the product using the product plan.

Figure 1:
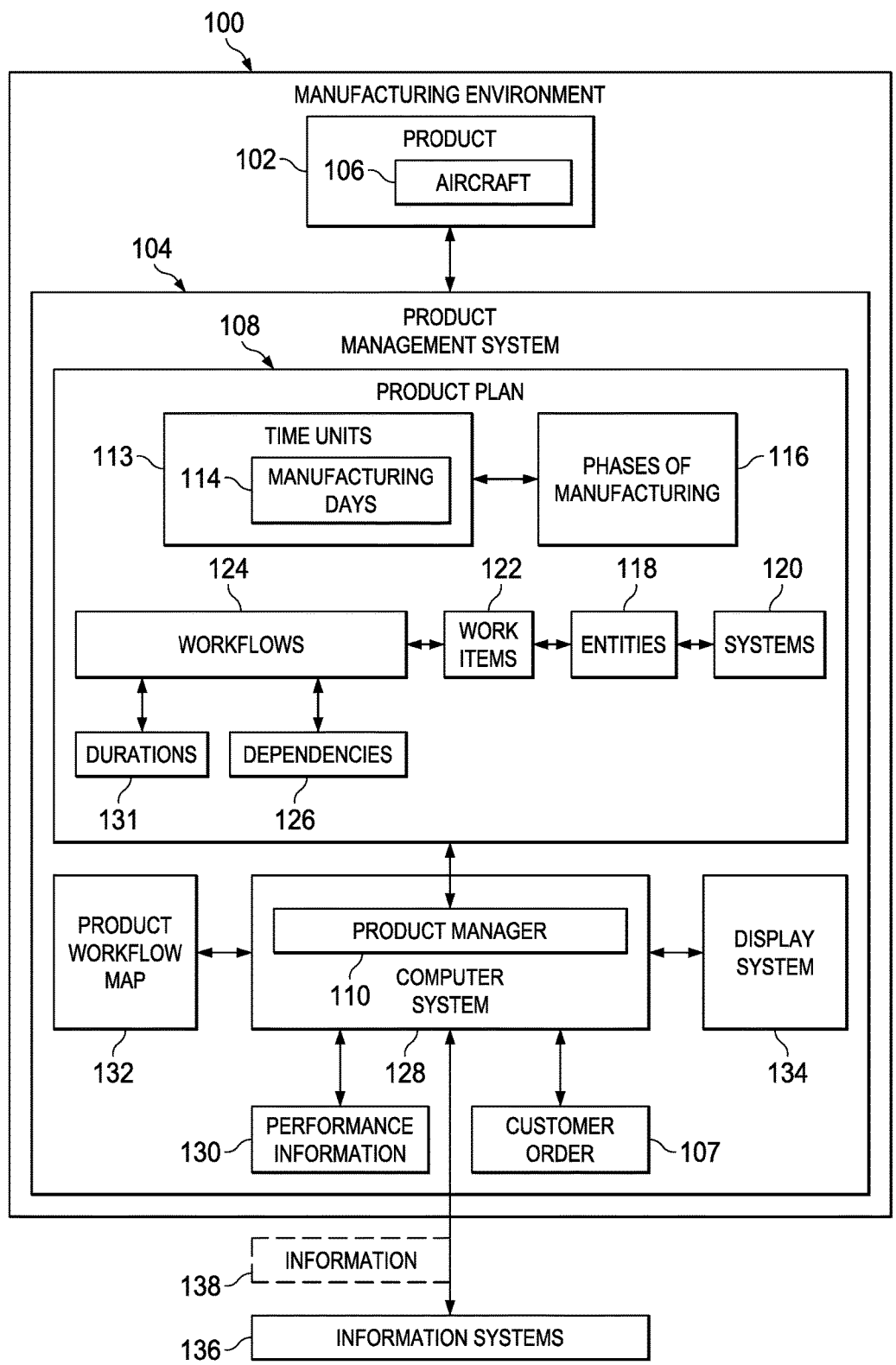
FIG. 1 is an illustration of a block diagram of a manufacturing environment in accordance with an illustrative embodiment.

With reference now to the figures and, in particular, with reference to FIG. 1, an illustration of a block diagram of a manufacturing environment is depicted in accordance with an illustrative embodiment. As depicted, manufacturing environment 100 is configured to manufacture product 102 in product management system 104. In this illustrative example, product 102 is aircraft 106. Aircraft 106 may be an airplane, a rotorcraft, unmanned aerial vehicle, or some other suitable type of aircraft.

As depicted, product management system 104 is configured to manufacture product 102 when customer order 107 is received. The manufacturing of product 102 may include performing design changes, workflow changes, and other operations to fulfill customer order 107. For example, customer order 107 requests options or changes to a configuration of product 102.

In this illustrative example, the manufacturing of product 102 by product management system 104 is performed using product plan 108 and product manager 110. Product plan 108 comprises time units 113 during which manufacturing of product 102 occurs. A time unit in time units 113 is a period of time during which work is performed. Time units 113 provide a measurement of time for manufacturing product 102 and may be used to define durations for work performed to manufacture product 102.

In this illustrative example, time units 113 are manufacturing days 114. A manufacturing day in manufacturing days 114 is a day when work is performed to manufacture product 102. For example, if manufacturing is only performed during the week and not on the weekend, manufacturing days 114 only include the days during the week.

In other examples, manufacturing may be performed every day of the week. Further, in other illustrative examples, time units 113 may take other forms, such as hours, minutes, weeks, or other types of time units. For example, a time unit may be 1 hour, 12 hours, 30 minutes, or some other period of time.

Within product plan 108, manufacturing days 114 are grouped into phases of manufacturing 116. Entities 118 perform work on systems 120 for product 102. Entities 118 may take various forms. For example, entities 118 may be selected from at least one of a supplier, a manufacturer, a design department, an engineering group, an inspection department, a person, an installation team, or some other suitable grouping of people.

Product plan 108 also includes work items 122 performed by entities 118 during manufacturing days 114. Work items 122 are any operations performed to manufacture product 102. For example, entities 118 may perform work items 122 to perform work on systems 120. Work items 122 may include performing operations for at least one of an assembly task, a certification event, a database update, a design activity, a fabrication activity, an approval of a product configuration, a transfer of an assembly to a new work location, a receipt of a part from a supplier, a creation of an engineering drawing, a release of an engineering drawing, a revision to an engineering drawing, a publication of a coordination memo, a submittal of a purchase order, a management review, a software release, a forming of a system test, and other tasks involved in manufacturing product 102. Work items 122 may include at least one of coordination sheets, decision points, engineering drawings, explanatory notes, or other suitable items that may be used to perform operations in work items 122.

Further, product plan 108 organizes work items 122 within workflows 124. In other words, an order in which work items 122 are to be performed is defined by workflows 124.

For example, some of work items 122 may be performed sequentially in which one work item is performed after another work item is completed. In another example, some of work items 122 may be performed at the same time or substantially the same time.

Additionally, product plan 108 also includes dependencies 126. A dependency in dependencies 126 is an association between items in which the performance of one item is needed for the performance of the other item.

These items may be work items 122, workflows 124, or some combination thereof. In the illustrative example, a dependency may be pointers to two or more of work items 122, workflows 124, or some combination thereof. Dependencies 126 are stored within product plan 108 in this illustrative example. Dependencies 126 have different classifications. For example, dependencies 126 may be classified based on the type of dependency. For example, dependencies may include at least one of parts, tools, materials, data, workers, facilities, assembly sequences, or other types of dependencies.

Dependencies 126 may be present between at least one of work items 122 or workflows 124. The dependencies may be for some portion of work items 122, workflows 124, or some combination thereof. Dependencies 126 between at least one of work items 122 or workflows 124 may be used to identify an order in which work items 122 are performed.

As used herein, the phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

As depicted, product manager 110 is located in computer system 128 and controls the manufacturing of product 102 using product plan 108. Controlling the manufacturing of product 102 also may include monitoring operations performed to manufacture product 102.

Product manager 110 may be implemented in software, hardware, firmware, or a combination thereof. When software is used, the operations performed by product manager 110 may be implemented in program code configured to run on hardware, such as a processor unit. When firmware is used, the operations performed by product manager 110 may be implemented in program code and data and stored in persistent memory to run on a processor unit. When hardware is employed, the hardware may include circuits that operate to perform the operations in product manager 110.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

Computer system 128 is a physical hardware system within product management system 104 and includes one or more data processing systems. When more than one data processing system is present, those data processing systems are in communication with each other using a communications medium. The communications medium may be a network. The data processing systems may be selected from at least one of a computer, a server computer, a tablet, or some other suitable data processing system.

In this illustrative example, product plan 108 is a dynamic product plan. In other words, product plan 108 is not fixed and may change during the manufacturing of product 102. In one illustrative example, product manager 110 changes product plan 108 when performance information 130 about the manufacturing of product 102 received during the manufacturing of product 102 affects timing of workflows 124. The timing of workflows 124 may be affected in a number of different ways including, as an example, at least one of delays of work items 122, early completions of work items 122, unavailability of parts, equipment malfunctions, rework of parts, or other events that may change how long or when work is performed. For example, product manager 110 receives performance information 130 about the manufacturing of product 102 during the manufacturing of product 102 and changes product plan 108 as needed during the manufacturing of product 102.

Performance information 130 is information about how work items 122 are performed during the manufacturing of product 102. For example, performance information 130 may be selected from at least one of a change in a part delivery date, a delay in completing a work item, an availability of parts, a revision to a work item, a rework performed, a task duration, an actual task completion date, an actual start date, or other events may be described in performance information 130.

These events may result in a need to change product plan 108. For example, if a first work item has a dependency on a second work item, a delay in the first work item also may result in a delay in the second work item. As a result, product plan 108 may be changed to revise the scheduling of when the second work item is to be performed when performance information 130 is received, indicating that a delay is present in the first work item.

Product manager 110 may change a group of work items 122 in product plan 108 using performance information 130. In this manner, product plan 108 is a dynamic product plan that changes to make adjustments for how work items 122 are formed. As used herein, a "group of", when used with reference to items, means one or more items. For example, a "group of work items 122" is one or more of work items 122.

For example, in changing the group of work items 122, product manager 110 performs at least one of changing a flow of work items 122, changing an order in which work items 122 are performed, adding a work item, removing the work item, reassigning the work item to another entity, or some other suitable change. In changing the flow of work items 122, product manager 110 changes a group of workflows 124. For example, product manager 110 may control at least one of dependencies 126 or durations 131 of workflows 124 in the manufacturing of product 102 using product plan 108.

In this manner, product manager 110 may make automated changes to product plan 108. As a result, automated changes to product plan 108 during the manufacturing of product 102 may result in a more efficient manufacturing of product 102.

As depicted, product manager 110 may communicate with information systems 136. Information systems 136 are computer systems. Information systems 136 may be part of the same organization that manufactures aircraft 106, part of other organizations, or some combination thereof.

In this illustrative example, product manager 110 may communicate with information systems 136 to exchange information 138. As depicted, information systems 136 may include at least one of an ordering system for parts, a scheduling system, a product design system, and other suitable types of information systems.

An ordering system is operated to order and track the delivery of parts. A scheduling system generates schedules for performing tasks, such as manufacturing parts, assembling parts to form assemblies, inspections, and other suitable tasks. As depicted, the scheduled tasks include work items 122 for manufacturing aircraft 106. The design system may include computer-aided design stations that are operated for at least one of creating, modifying, or managing designs for products, such as aircraft 106.

For example, product manager 110 exchanges information 138 with one or more of information systems 136. For example, product manager 110 may receive information 138 that is selected from at least one of work order statuses, delivery schedules of parts, inspection results, or other suitable information. This information may be used to manage product plan 108. For example, information 138 is used to determine whether changes to product plan 108 are needed. Additionally, product manager 110 may send information 138 to information systems 136.

Information 138 may be sent to manage the manufacturing of aircraft 106. For example, product manager 110 may send information 138 that is selected from at least one of requesting ordering parts, performing a design change, scheduling work orders, or other suitable requests that may be performed by information systems 136 as part of manufacturing aircraft 106. Further, information 138 may be information used by information systems 136 for other purposes other than manufacturing aircraft 106. For example, information 138 may sent to an accounting department for use in invoicing a customer. Information 138 may be sent to the accounting department to place received parts in line for payment.

In this illustrative example, product manager 110 may control the manufacturing of product 102 through making product plan 108 available to entities 118. For example, product manager 110 may create product workflow map 132 from product plan 108. Product workflow map 132 is a visualization of product plan 108.

Product manager 110 displays product workflow map 132 on display system 134 to a group of entities 118. Display system 134 is a physical hardware system and includes one or more display devices on which product workflow map 132 may be displayed. The display devices may include at least one of a light emitting diode (LED) display, a liquid crystal display (LCD), an organic light emitting diode (OLED) display, or some other suitable display device. When more than one display device is present, these display devices may be at the same or different locations. Further, the different display devices may be in communication with the same or different data processing system in computer system 128.

In one illustrative example, one or more technical solutions are present that overcome a technical problem with managing the manufacturing of product 102, such as aircraft 106. As a result, one or more technical solutions may provide a technical effect of reducing the time and effort needed to update product plan 108 to reflect changes needed as a result of receiving performance information 130. Currently, the time and effort needed to make changes to product plan 108 make it infeasible to update product plan 108 as needed during the manufacturing of product 102. As a result, product plan 108 may be out of date and inefficiencies in the manufacturing of product 102 may result in delays in completing product 102.

As a result, computer system 128 operates as a special purpose computer system in which product manager 110 in computer system 128 enables changing product plan 108 in a desired manner. In particular, product manager 110 transforms computer system 128 into a special purpose computer system, as compared to currently available general computer systems that do not have product manager 110. Computer system 128 performs a transformation of data in which product plan 108 is transformed into product workflow map 132 for visualization.

Figure 2:
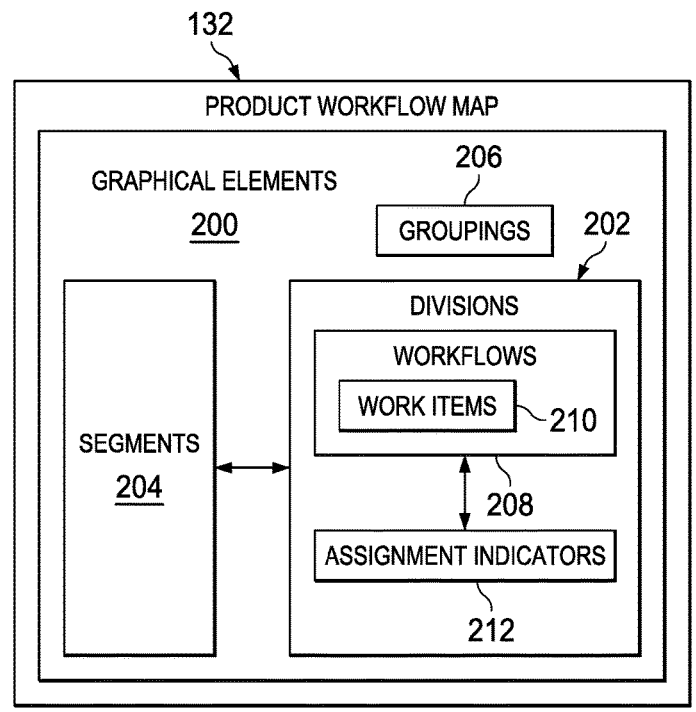
FIG. 2 is an illustration of a block diagram of a product workflow map in accordance with an illustrative embodiment.

With reference now to FIG. 2, an illustration of a block diagram of a product workflow map is depicted in accordance with an illustrative embodiment. In this illustrative example, product manager 110 in FIG. 1 creates product workflow map 132 from product plan 108 in FIG. 1 for display on display system 134 in FIG. 1.

As depicted, product workflow map 132 is comprised of graphical elements 200. Graphical elements 200 include divisions 202, segments 204, groupings 206, workflows 208, work items 210, and assignment indicators 212.

Divisions 202 represent manufacturing days 114 in product plan 108 during which the manufacturing of product 102 in FIG. 1 occurs. Segments 204 extend across divisions 202 in which segments 204 represent systems 120 in FIG. 1 in product plan 108 for product 102 in FIG. 1. Groupings 206 are graphical groupings of divisions 202 that represent phases of manufacturing 116 in FIG. 1 in product plan 108.

Workflows 208 are graphical representations of workflows 124 in FIG. 1 in product plan 108. Workflows 208 are comprised of work items 210 arranged across divisions 202 representing manufacturing days 114 in FIG. 1. Work items 210 are graphical elements representing work items 122 in FIG. 1 in product plan 108. Product workflow map 132 enables a display of product plan 108 on display system 134 in FIG. 1.

In this illustrative example, assignment indicators 212 indicate an assignment of a group of work items 122 to entities 118 in FIG. 1. Work items 122 in FIG. 1 are represented as work items 210 in graphical elements 200.

Assignment indicators 212 are graphical indicators that are associated with at least one of work items 210 or workflows 208. In being associated with a work item or workflow, an assignment indicator in assignment indicators 212 may be displayed as part of the work item or workflow, displayed in proximity of the work item or workflow to draw attention to the work item or workflow, or some other suitable manner to indicate that an entity is assigned to the work item or workflow.

Assignment indicators 212 may take various forms. For example, assignment indicators 212 may be selected from at least one of color, font size, bolding, italics, underlining, animation, an icon, or some other suitable type of graphical indicator that draws attention to a work item or workflow to indicate that an entity that is assigned to perform the work item or workflow.

Figure 3:
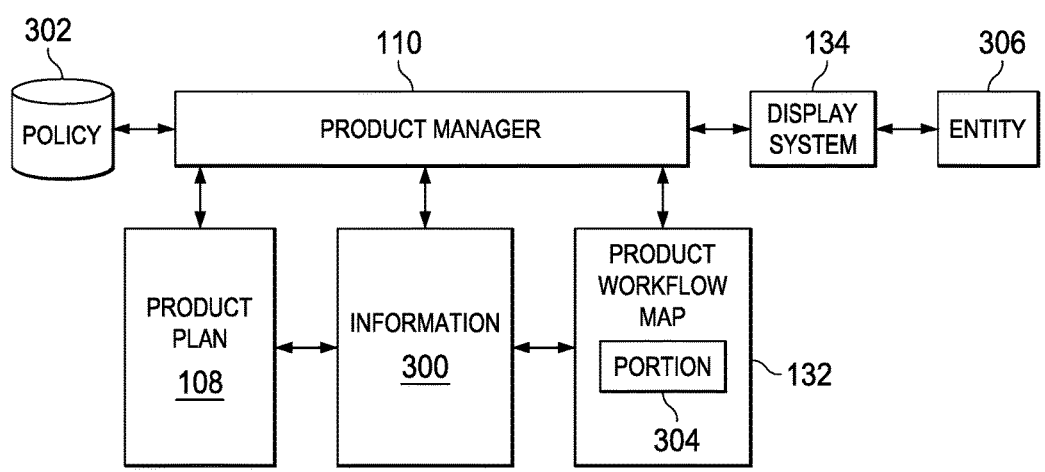
FIG. 3 is an illustration of a block diagram of controlling access to a product plan in accordance with an illustrative embodiment.

Turning next to FIG. 3, an illustration of a block diagram of controlling access to a product plan is depicted in accordance with an illustrative embodiment. In this illustrative example, product manager 110 may be configured to control access to information 300 in product plan 108. In controlling access to product plan 108, product manager 110 also controls access to product workflow map 132, which is a visualization of information 300 in product plan 108, which may be displayed on display system 134. For example, not all of product workflow map 132 may be displayed to an entity in entities 118 in FIG. 1. In some illustrative examples, a customized product workflow map may be created for each of entities 118. As a result, different ones of entities 118 may see different portions of product workflow map 132.

In this illustrative example, product manager 110 controls access to information 300 for product plan 108 and information 300 visualized in product workflow map 132 using policy 302. Policy 302 is one or more rules that define how information 300 may be accessed. For example, policy 302 may include rules that define which ones of entities 118 may access information 300, what portion of information 300 that particular ones of entities 118 may access, and other suitable rules for controlling access to information 300.

For example, portion 304 of product workflow map 132 is displayed on display system 134 to entity 306 in entities 118 in FIG. 1. As depicted, portion 304 includes information 300 used by entity 306 to perform work on a group of work items 210 in FIG. 2 in product workflow map 132 assigned to entity 306. Other parts of product workflow map 132 are displayed without information 300 or reduced amounts of information 300. In this manner, access to confidential or sensitive information in information 300 may be protected from undesired access. This technical solution provides a technical effect in which product workflow map 132 may be displayed to many different entities. The control of access to confidential or sensitive information in information 300 may be performed by setting permissions for different portions of information 300. This type of control may be implemented using various control mechanisms, such as an access control list. The access control list is a list of permissions to different portions of information 300. The permissions may be given to particular users, applications, or other processes or devices that may request access to information 300.

Product manager 110 identifies information 300 for portion 304 of product workflow map 132 displayed on display system 134 to entity 306 using policy 302. Portion 304 of information 300 not relevant to or needed by entity 306 is not displayed in product workflow map 132 on display system 134 to entity 306.

In this manner, access to confidential information in information 300 may be controlled in a manner that provides access only to entities in entities 118 in FIG. 1 that should view that information in product workflow map 132. Other workflows and items may be not shown, obscured, or shown generally without providing details about work items 210, which ones of entities 118 are assigned work items 210, or other information that entity 306 should not have access to in viewing product workflow map 132.

Similar controls to access information 300 may be performed by product manager 110, with respect to information 300 in product plan 108, if entities 118 are allowed to access product plan 108 directly to obtain information 300 to perform work items 122 in product plan 108. In this manner, access to confidential or sensitive information in information 300 may be protected from undesired access. This technical solution provides a technical effect in which at least one of product plan 108 or product workflow map 132 may be accessed by many different entities. In addition to controlling access in the form of viewing information 300, other types of access may also be controlled, such as writing, changing, deleting, or other types of access to information 300.

Figure 4:
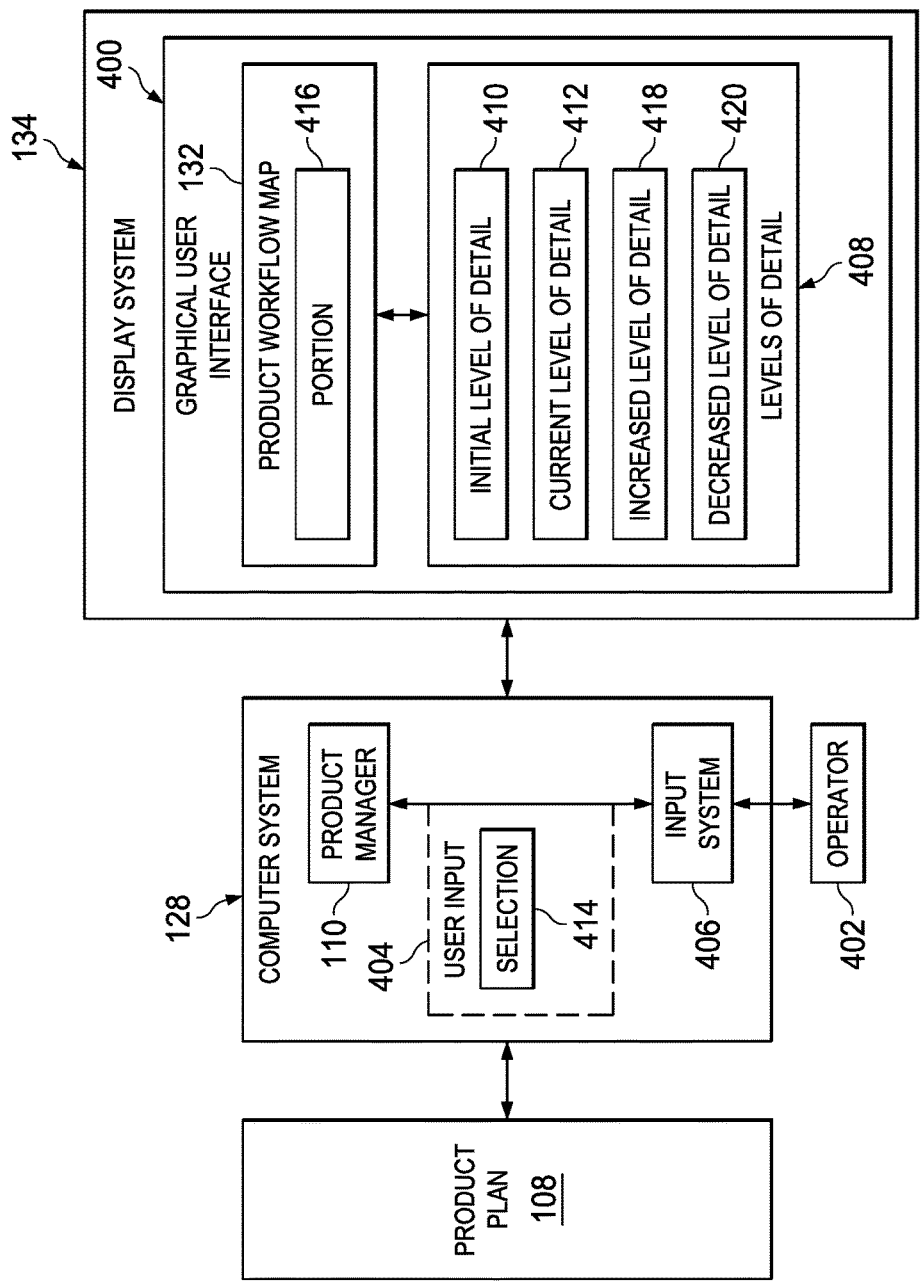
FIG. 4 is an illustration of a block diagram illustrating data flow in displaying information in a product workflow map in accordance with an illustrative embodiment.

With reference now to FIG. 4, an illustration of a block diagram illustrating data flow in displaying information in a product workflow map is depicted in accordance with an illustrative embodiment. In this illustrative example, product manager 110 creates product workflow map 132 from product plan 108 and displays product workflow map 132 in graphical user interface 400 on display system 134.

As depicted, operator 402 may interact with product workflow map 132 displayed in graphical user interface 400. Operator 402 is a person that may interact with graphical user interface 400 through user input 404 generated by input system 406 in computer system 128. In this illustrative example, operator 402 is a person belonging to one of entities 118 shown in block form in FIG. 1. Input system 406 is a physical hardware system and may be selected from at least one of a mouse, a keyboard, a trackball, a touchscreen, a stylus, a motion sensing input device, a cyberglove, or some other suitable type of input device.

As depicted, product workflow map 132 has levels of detail 408 that may be displayed on display system 134. Initial level of detail 410 in levels of detail 408 is first displayed in graphical user interface 400 on display system 134. The amount of information 300 in FIG. 3 from product plan 108 that is shown is initial level of detail 410 for product workflow map 132.

Initial level of detail 410 maybe be selected based on a number of factors. For example, initial level of detail 410 may be a default level of detail in levels of detail 408 that is displayed. Initial level of detail 410 may be identified based on the size of a display device in display system 134 on which product workflow map 132 is displayed. Product workflow map 132 is initially displayed with initial level of detail 410. Initial level of detail 410 is current level of detail 412.

In this illustrative example, user input 404 is received from operator 402 through input system 406 to change current level of detail 412 to some other level of detail in levels of detail 408. The change may increase or decrease the levels in levels of detail 408 to increase or decrease the amount of information 300 in FIG. 3 that is displayed in product workflow map 132.

For example, user input 404 may include selection 414 of portion 416 in product workflow map 132 being displayed at current level of detail 412. In this illustrative example, selection 414 of portion 416 results in increased level of detail 418 in information 300 in FIG. 3 being displayed in product workflow map 132. In other illustrative examples, selection 414 may result in decreased level of detail 420.

When selection 414 results in increased level of detail 418, selection 414 of portion 416 may be a selection of one or more of graphical elements 200 in FIG. 2. For example, selection 414 may select at least one of a group of work items 210, a group of workflows 208, a group of divisions 202, a group of segments 204, groupings 206, a group of assignment indicators 212, or some other group of graphical elements 200 displayed in product workflow map 132. With the selected graphical elements in graphical elements 200, product manager 110 identifies how much of performance information 130 in FIG. 1 is displayed in product workflow map 132 for increased level of detail 418 for the selected graphical elements in graphical elements 200.

For example, a workflow in workflows 208 in FIG. 2 may be displayed in current level of detail 412, where work items 210 in FIG. 2 are not shown for that workflow. A selection of that workflow causes product manager 110 to display an identification of work items in the selected workflow.

In another illustrative example, the selection of a work item may result in additional information about the work item being displayed. For example, the selection of the work item may show materials; instructions for performing assembly; universal resource locators to documents, spreadsheets, images, videos; or other information that is not shown at a lower level of detail. The display of information 300 in FIG. 3 at levels of detail 408 in this figure may be subject to policy 302 and the manner in which product manager 110 provides access to information 300 using policy 302 in FIG. 3.

Figure 5:
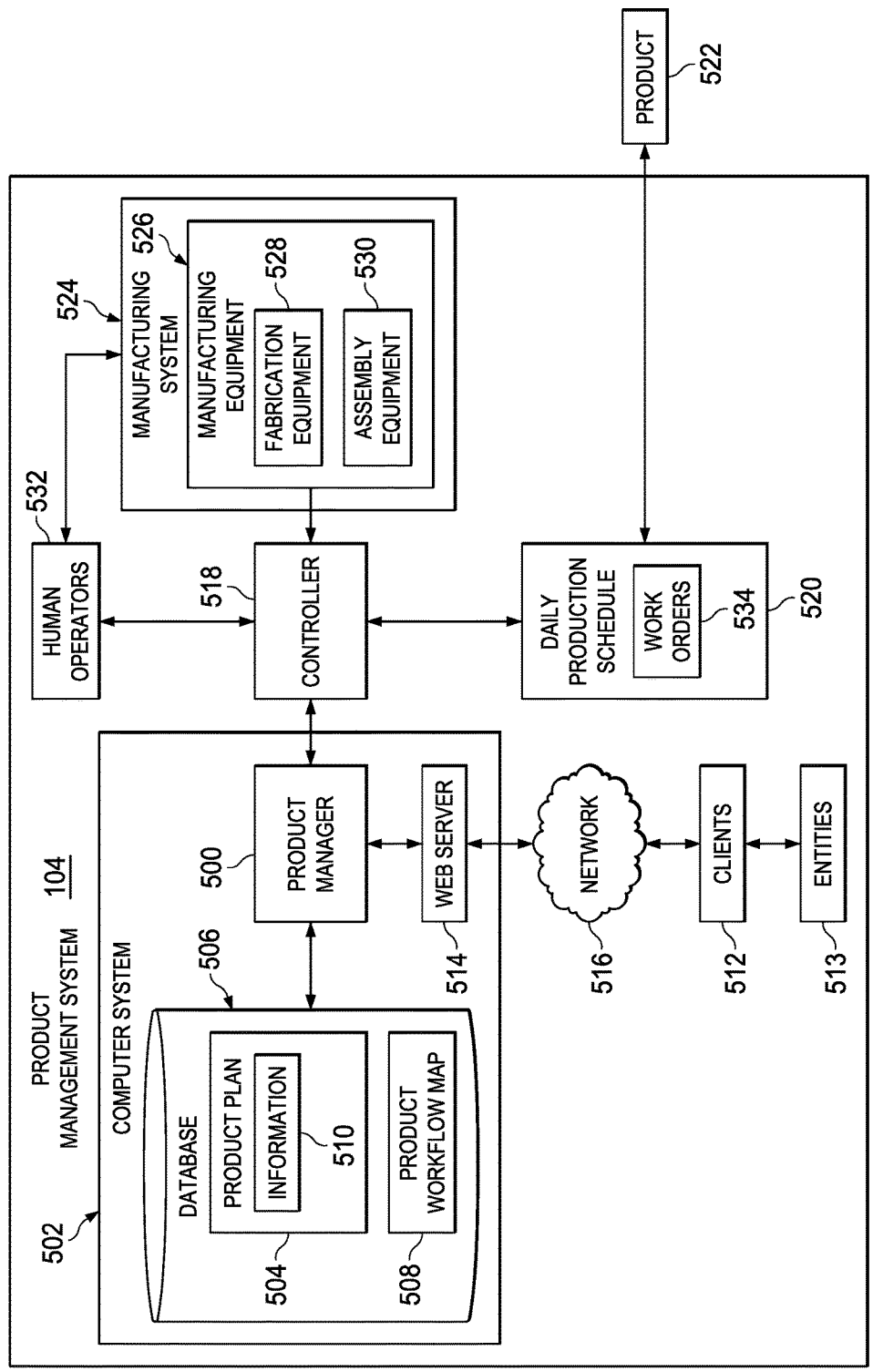
FIG. 5 is an illustration of a product management system in accordance with an illustrative embodiment.

With reference now to FIG. 5, an illustration of a product management system is depicted in accordance with an illustrative embodiment. In this illustrative example, another implementation for product management system 104 is shown. As depicted, product management system 104 includes product manager 500 in computer system 502. Product manager 500 provides functionality similar to as product manager 110 in FIG. 1.

In this illustrative example, product plan 504 is stored in database 506. Additionally, product workflow map 508 is created from product plan 504 and is also stored in database 506. Depending on the view, only portions of information 510 are used for product workflow map 508.

In this illustrative example, clients 512 for entities 513 may access at least one of product plan 504 or product workflow map 508 through web server 514 over network 516. Clients 512 are hardware and may include software. Clients 512 may be, for example, selected from at least one of a desktop computer, a server computer, a laptop computer, a tablet computer, a mobile phone, or some other suitable device that is capable of processing information. Clients 512 may be located at different locations to allow access to at least one of product plan 504 or product workflow map 508.

In this illustrative example, product manager 500 also is in communication with controller 518. Controller 518 is hardware and may also include software or other types of components. The hardware in controller 518 may include computers, circuits, networks, and other types of physical equipment. In this illustrative example, controller 518 generates daily production schedule 520 that is used to manufacture product 522 in manufacturing system 524.

Manufacturing system 524 is a hardware system and is configured to manufacture product 522 which may take various forms, such as an aircraft or other suitable product. As depicted, manufacturing system 524 includes manufacturing equipment 526. Manufacturing equipment 526 includes at least one of fabrication equipment 528 or assembly equipment 530.

Fabrication equipment 528 is equipment that may be used to fabricate components for parts used to form product 522. For example, fabrication equipment 528 may include machines and tools. These machines and tools may be at least one of a drill, a hydraulic press, a furnace, a mold, a composite tape laying machine, a vacuum system, a lathe, or other suitable types of equipment. Fabrication equipment 528 may be used to fabricate at least one of metal parts, composite parts, semiconductors, circuits, fasteners, ribs, skin panels, spars, antennas, or other suitable types of parts.

Assembly equipment 530 is equipment used to assemble parts to form product 522. In particular, assembly equipment 530 may be used to assemble components and parts to form product 522. Assembly equipment 530 also may include machines and tools. These machines and tools may be at least one of a robotic arm, a crawler, a fastener installation system, a rail-based drilling system, or a robot. Assembly equipment 530 may be used to assemble parts, such as seats, horizontal stabilizers, wings, engines, engine housings, landing gear systems, and other parts for product 522.

In addition to generating daily production schedule 520, controller 518 also may be configured to control the operation of manufacturing system 524. In particular, controller 518 may control the operation of at least one of fabrication equipment 528 or assembly equipment 530.

The control may take the form of direct control of manufacturing equipment 526. For example, robots, computer-controlled machines, and other equipment may be controlled by controller 518. In other illustrative examples, controller 518 may manage operations performed by human operators 532 in the manufacturing of product 522. For example, controller 518 may assign work items, provide instructions, display models, or perform other operations to manage operations performed by human operators 532. In these illustrative examples, product manager 500 is in communication with controller 518 to manage the manufacturing of product 522.

In the different illustrative examples, human operators 532 may operate or interact with at least one of manufacturing equipment 526 or controller 518. This interaction may be performed to manufacture product 522.

In this illustrative example, daily production schedule 520 may include work orders 534. Based on progress in performing work orders 534 in daily production schedule 520, product manager 500 may make changes to product plan 504 during the manufacturing of product 522.

Entities 513 may be included in manufacturing system 524. Entities 513 may include suppliers, vendors, customers, or other suitable types of entities. Entities 513 may access information 510 in product plan 504 or in a visualization through product workflow map 508. Further, one or more of entities 513 may update product plan 504. This update may be made directly to product plan 504 or through changes to product workflow map 508 for data reflected in product plan 504.

As manufacturing product 522 progresses, updates and changes may be made to product plan 504. In this manner, product 522 may be manufactured more efficiently with an ability to make updates to product plan 504 while the manufacturing of product 522 occurs. In this manner, daily production schedule 520 may be adjusted as needed to increase the efficiency at which product 522 is manufactured by the entity in entities 513. The entity is one that performs manufacturing using manufacturing system 524. This entity depends on other ones of entities 513, such as vendors, contractors, part suppliers, or other entities that may be relied on in the manufacturing of product 522.

The illustration of manufacturing environment 100 and the different components in manufacturing environment 100 in FIGS. 1-5 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although the illustrative examples are described with respect to a product in the form of aircraft 106 in FIG. 1, other illustrative examples may be applied to other types of platforms. The platform may be, for example, a mobile platform, a stationary platform, a land-based structure, an aquatic-based structure, and a space-based structure. More specifically, the platform may be a surface ship, a tank, a personnel carrier, a train, a spacecraft, a space station, a satellite, a submarine, an automobile, a power plant, a bridge, a dam, a house, a manufacturing facility, a building, and other suitable platforms.

In another illustrative example, product manager 110 in FIG. 1 may be distributed on different computers when computer system 128 in FIG. 1 includes more than one computer. In still another illustrative example, product workflow map 132 in FIG. 1 may include other information in addition or in place of graphical elements 200 shown in FIG. 2. For example, graphical indicators may be included to identify work items 210 in FIG. 2 that are critical work items to longtime completion of product 102 in FIG. 1. Graphical indicators also may be included to indicate which ones of work items 210 are running late, on time, or ahead of schedule. Product workflow map 132 may include legends. Also, product workflow map 132 may be interactive in which different levels of detail in levels of detail 408 in FIG. 4, in addition to current level of detail 412 in FIG. 4, may be shown in a pop-up window, tool tips, a frame, or other suitable techniques.

Figure 6:
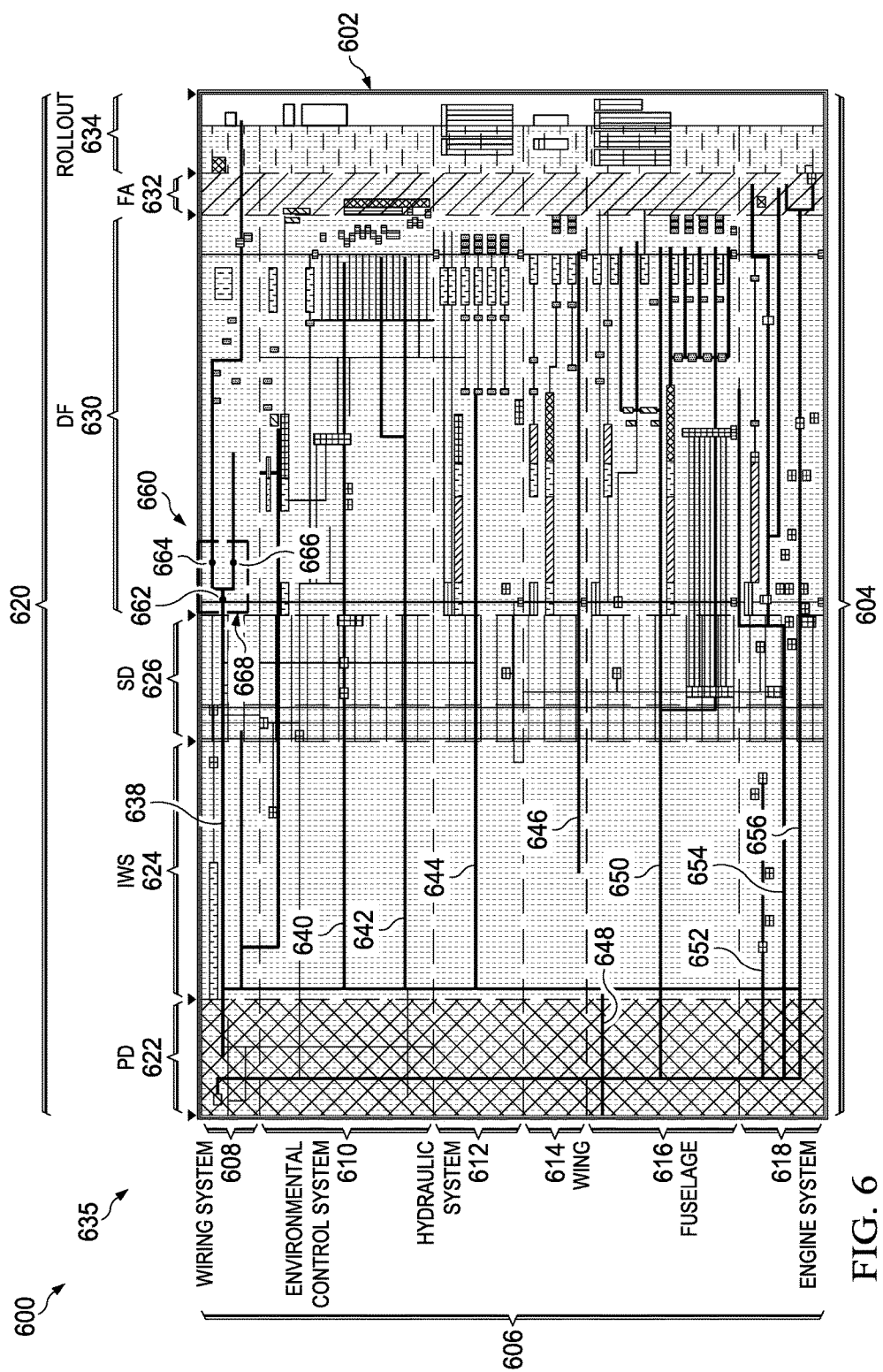
FIG. 6 is an illustration of a product workflow map in accordance with an illustrative embodiment.

With reference next to FIG. 6, an illustration of a product workflow map is depicted in accordance with an illustrative embodiment. Product workflow map 600 is displayed in graphical user interface 602 on display system 134 in FIG. 1. Product workflow map 600 is an example of one implementation of product workflow map 132 shown in block form in FIG. 2. As depicted, product workflow map 600 is for a commercial airplane.

In this illustrative example, product workflow map 600 has vertical lines 604. Vertical lines 604 are examples of divisions 202, shown in block form in FIG. 2, representing manufacturing days 114, shown in block form in FIG. 1.

In this illustrative example, segments 606 extend horizontally across product workflow map 600. Each of segments 606 represents a system in the commercial airplane. As depicted, segments 606 include wiring system 608, environmental control system 610, hydraulic system 612, wing 614, fuselage 616, and engine system 618. Other types of segments may be present in addition to or in place of the segments illustrated in this figure.

As depicted, groupings 620 are groupings of vertical lines 604. Groupings 620 represent phases of manufacturing for the commercial aircraft. In this illustrative example, groupings 620 include program directive (PD) 622, integrated work statements (IWS) 624, system definition (SD) 626, design and fabrication (DF) 630, final assembly (FA) 632, and rollout 634.

In this illustrative example, product workflow map 600 also includes workflows 635. One or more of workflows 635 are present for each of the systems represented in segments 606 of product workflow map 600. For example, workflow 638 is present in wiring system 608. Workflow 640 and workflow 642 are present in environmental control system 610; workflow 644 is present in hydraulic system 612; workflow 646 is present in wing 614; and workflow 648 and workflow 650 are present in fuselage 616. Workflow 652, workflow 654, and workflow 656 are present in engine system 618.

Work items 660 are also displayed in product workflow map 600. As depicted, work items 660 are seen on workflows 635. In this illustrative example, product workflow map 600 is shown in a first level of detail. For example, details about work items 660 are not shown in this view of product workflow map 600. Instead, work items 660 are shown generally as blocks in product workflow map 600.

As depicted, user input may be received to select portion 668 of product workflow map 600. Portion 668 includes work item 662, work item 664, and work item 666 that are part of workflow 638. In this example, workflow 638 branches at work item 662. Work item 662 is connected to both work item 664 and work item 666.

The selection of portion 668 results in more information about product workflow map 600 being shown at an increased level of detail in product workflow map 600. For example, product manager 110 in FIG. 1 may display an enlarged view of portion 668 to display more details of work item 662, work item 664, and work item 666, as shown in FIG. 7 and described below in the description of FIG. 7.

Figure 7:
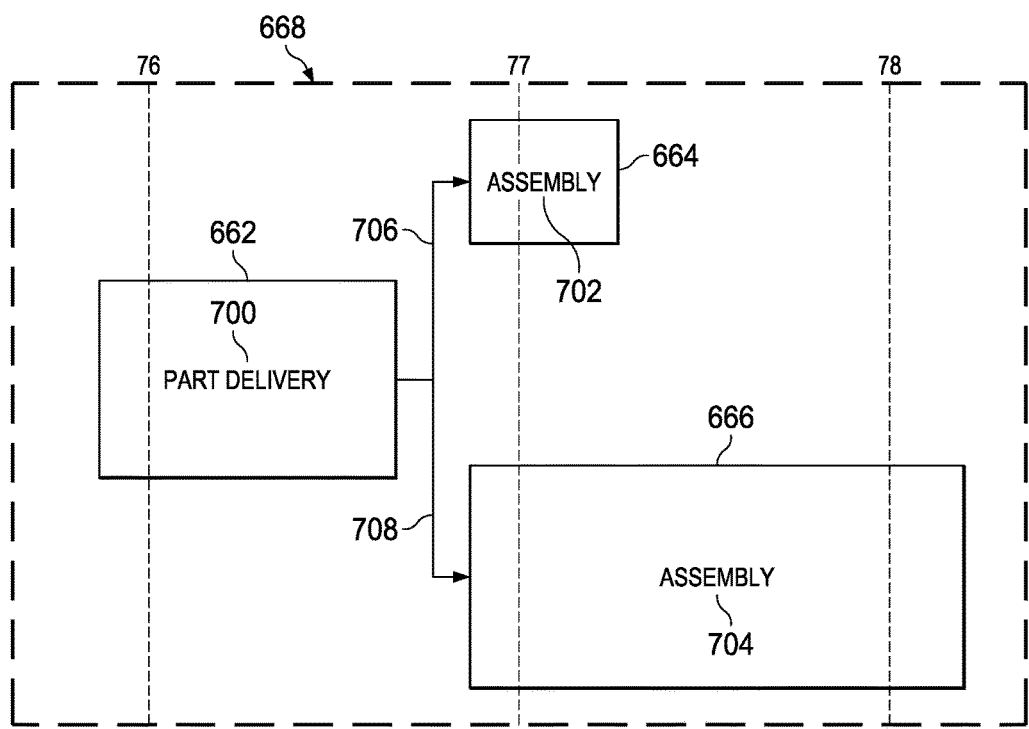
FIG. 7 is an illustration of an enlarged portion of a product work workflow map in accordance with an illustrative embodiment.

With reference now to FIG. 7, an illustration of an enlarged portion of a product work workflow map is depicted in accordance with an illustrative embodiment. In FIG. 7, an enlarged view of portion 668 for product workflow map 600 in FIG. 6 is shown.

In this view, an increased level of detail is seen for work item 662, work item 664, and work item 666. At this level of detail, work item 662 is part delivery 700. Work item 662 indicates that part delivery 700 is a work item that occurs on manufacturing day 76.

Work item 664 is assembly 702. Work item 664 takes place over one manufacturing day, manufacturing day 77. Work item 666 also is assembly 704. Work item 666 shows that assembly 704 takes place over two manufacturing days, manufacturing days 77 and 78.

In this illustrative example, dependencies are present as illustrated by colored arrow 706 and colored arrow 708. Colored arrow 706 indicates that work item 664 has a dependency on work item 662. Colored arrow 708 indicates that work item 666 has a dependency on work item 662. Dependencies may be illustrated by other types of graphical indicators in addition to or in place of colored arrow 706 and colored arrow 708, depending on the particular implementation. For example, line thickness, line type, an icon, text, or other types of graphic indicators may be used to indicate the dependency between work item 662 and work item 664 and between work item 662 and work item 666.

Figure 8:
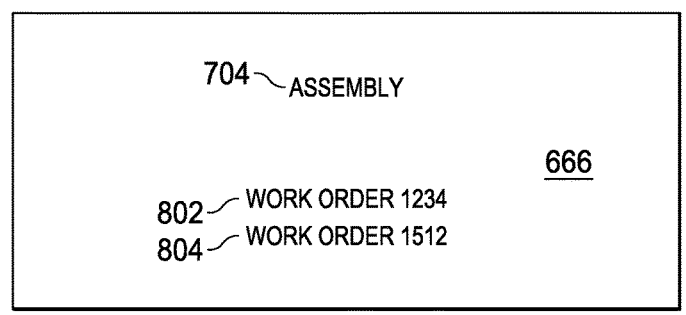
FIG. 8 is an illustration of information for a work item in a product workflow map in accordance with an illustrative embodiment.

Turning now to FIG. 8, an illustration of information for a work item in a product workflow map is depicted in accordance with an illustrative embodiment. In this illustrative example, work item 666 has been selected as a portion of product workflow map 600 in FIG. 6, for which an increased level of detail is shown.

In this view, additional details of work item 666 are shown. As depicted, creating assembly 704 for work item 666 includes a performance of "work order 1234" 802 and "work order 1512" 804. These two work orders may be assigned to people to perform operations for assembly 704. For example, "work order 1234" 802 may be performed to create assembly 704. "Work order 1512" 804 may be performed to inspect assembly 704. Completion of these two work orders results in assembly 704 that is ready for use.

Figure 9:
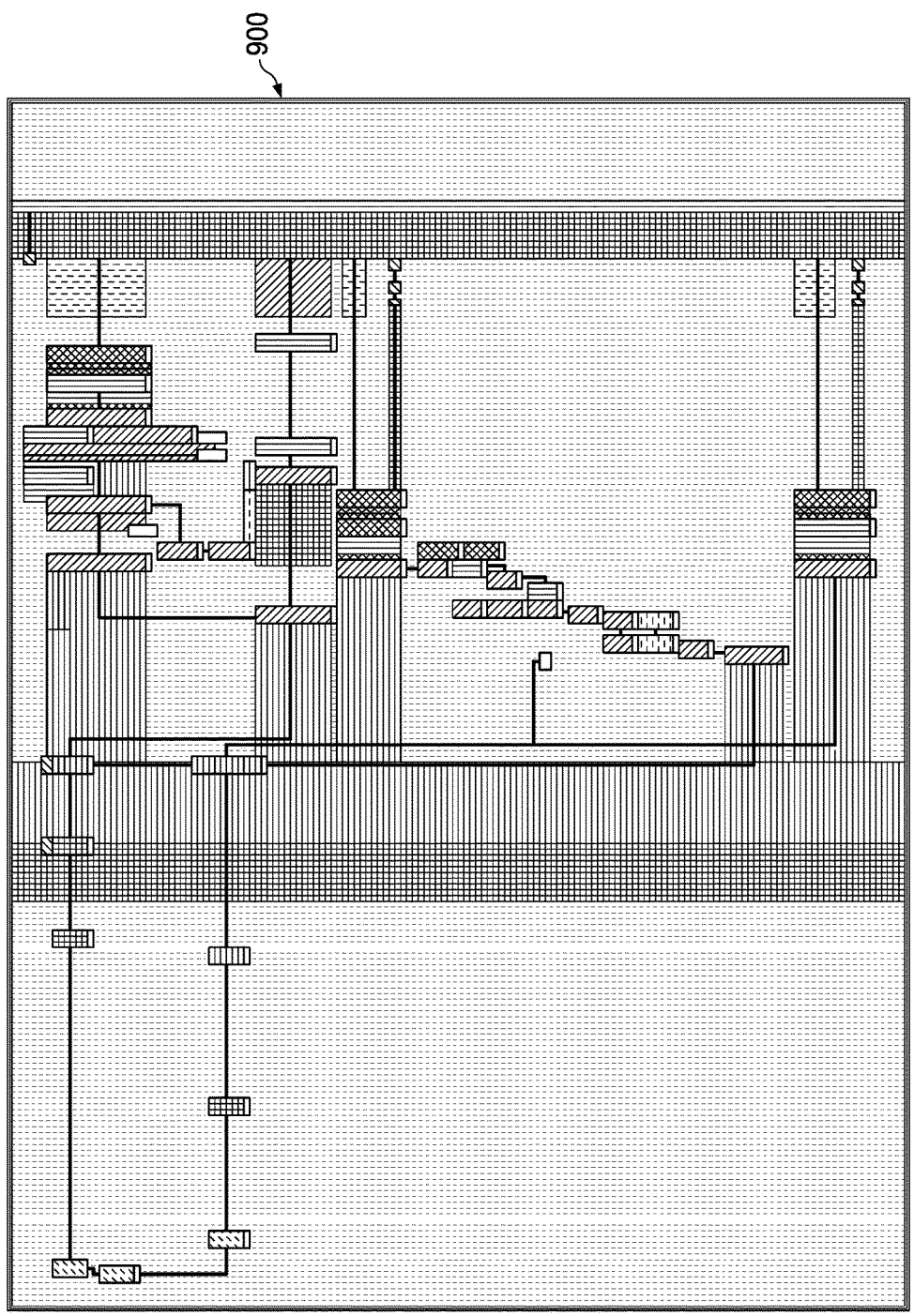
FIG. 9 is an illustration of a product workflow map in accordance with an illustrative embodiment.

With reference next to FIG. 9, an illustration of a product workflow map is depicted in accordance with an illustrative embodiment. Product workflow map 900 is displayed in graphical user interface 602 in FIG. 6 on display system 134 in FIG. 1. Product workflow map 900 is an example of one implementation of product workflow map 132 shown in block form in FIG. 2. As depicted, product workflow map 900 is for a product in the form of a wiring system in a commercial airplane and may be displayed on display system 134.

The illustration of product workflow map 600, as shown in FIGS. 6-8, and product workflow map 900, as shown in FIG. 9, is for purposes of illustrating one manner in which product workflow map 132 may be implemented. This example is not meant to limit the manner in which product workflow map 132 may be implemented in other examples. For example, the examples of segments shown in FIG. 6 are only shown for purposes of describing features in product workflow map 600. A commercial airplane has many more systems that are not shown in these examples to avoid obscuring the concepts shown in FIGS. 6-9.

Only a few examples of systems in a commercial airplane are shown in product workflow map 600. Other systems may be present in addition to or in place of the ones depicted. For example, other systems that may be present in other examples of product workflow map 600 include a braking system, a communication system, avionics, an in-flight entertainment system, a control surface system, and other suitable types of systems. As another example, additional workflows and work items are present, but not shown in product workflow map 600 for a commercial airplane.

Product workflow map 132 in FIG. 1 may be for other products in addition to or in place of a commercial airplane or a wiring system for the commercial airplane. For example, product workflow map 132 may be created from product plan 108 in FIG. 1 for a train, a building, a satellite, or some other suitable type of product.

Figure 10:
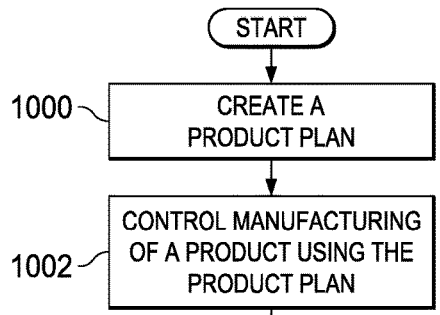
FIG. 10 is an illustration of a high level flowchart of a process for manufacturing a product in accordance with an illustrative embodiment.

Turning next to FIG. 10, an illustration of a high level flowchart of a process for manufacturing a product is depicted in accordance with an illustrative embodiment. The process illustrated in FIG. 10 may be implemented in manufacturing environment 100 to manufacture product 102 in FIG. 1. In these illustrative examples, different operations may be implemented in product manager 110 in FIG. 1.

The process begins by creating a product plan (operation 1000). The product plan comprises manufacturing days during which manufacturing of the product occurs, wherein the manufacturing days are grouped into phases of manufacturing; entities performing work on systems for the product; and work items performed by the entities during the manufacturing days.

In this example, the product plan may be created from information input by a human operator. In another example, the product plan may be created by a product workflow map and additional information entered that provide additional details.

The process controls manufacturing of a product using the product plan (operation 1002). The process terminates thereafter.

Figure 11:
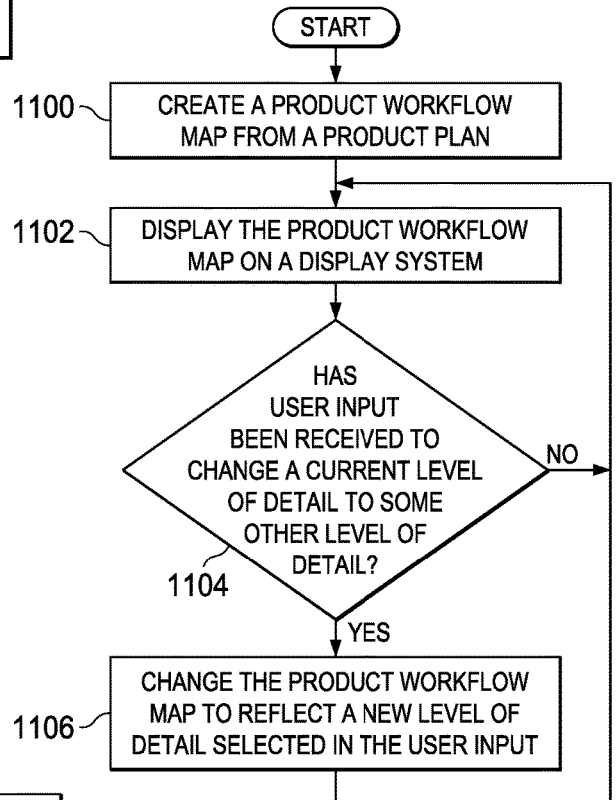
FIG. 11 is an illustration of a flowchart of a process for displaying a product plan in accordance with an illustrative embodiment.

Turning next to FIG. 11, an illustration of a flowchart of a process for displaying a product plan is depicted in accordance with an illustrative embodiment. The process illustrated in FIG. 11 may be implemented by product manager 110 in FIG. 1.

The process creates a product workflow map from a product plan (operation 1100). The product workflow map created in operation 1100 has an initial level of detail. The product workflow map comprises divisions representing the manufacturing days during which the manufacturing of the product occurs; segments extending across the divisions in which the segments represent the systems for the product; grouping of the divisions that represent the phases of manufacturing; and workflows comprised of the work items arranged across divisions representing the manufacturing days, enabling a display of the product plan on a display system. The product workflow map has different levels of detail that may be displayed.

The process displays the product workflow map on a display system (operation 1102). A determination is made as to whether user input has been received to change a current level of detail to some other level of detail (operation 1104). If the user input has been received to change the current level of detail, the product workflow map is changed to reflect a new level of detail selected in the user input (operation 1106). The new level of detail is an increased level of detail or a decreased level of detail from the current level of detail.

The process then returns to operation 1102. With reference again to operation at 1104, if the user input has not been received to change the current level of detail, the process also returns to operation 1102. In this manner, different amounts of information for the product plan may be displayed in the product workflow map to provide information that may be desired or needed.

Figure 12:
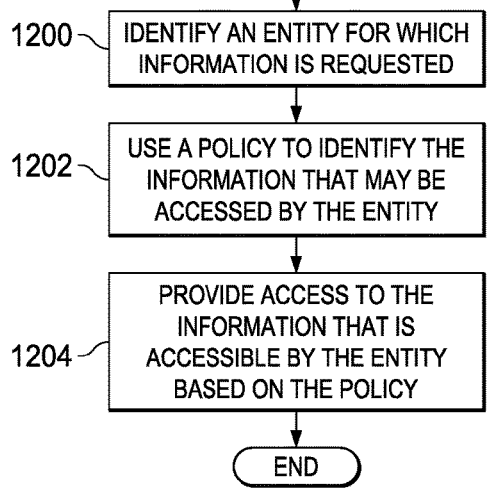
FIG. 12 is an illustration of a flowchart of a process for identifying information that may be accessed by an entity in accordance with an illustrative embodiment.

Turning now to FIG. 12, an illustration of a flowchart of a process for identifying information that may be accessed by an entity is depicted in accordance with an illustrative embodiment. The process illustrated in FIG. 12 may be implemented in product manager 110 shown in block form in FIG. 1. This process may be implemented in response to queries or requests for information 300 in FIG. 3 in product plan 108 in FIG. 1. This process also may be implemented as part of creating product workflow map 132 in FIG. 1 for display.

The process begins by identifying an entity for which information is requested (operation 1200). The process then uses a policy to identify the information that may be accessed by the entity (operation 1202).

The process then provides access to the information that is accessible by the entity based on the policy (operation 1204). The process terminates thereafter.

Figure 13:
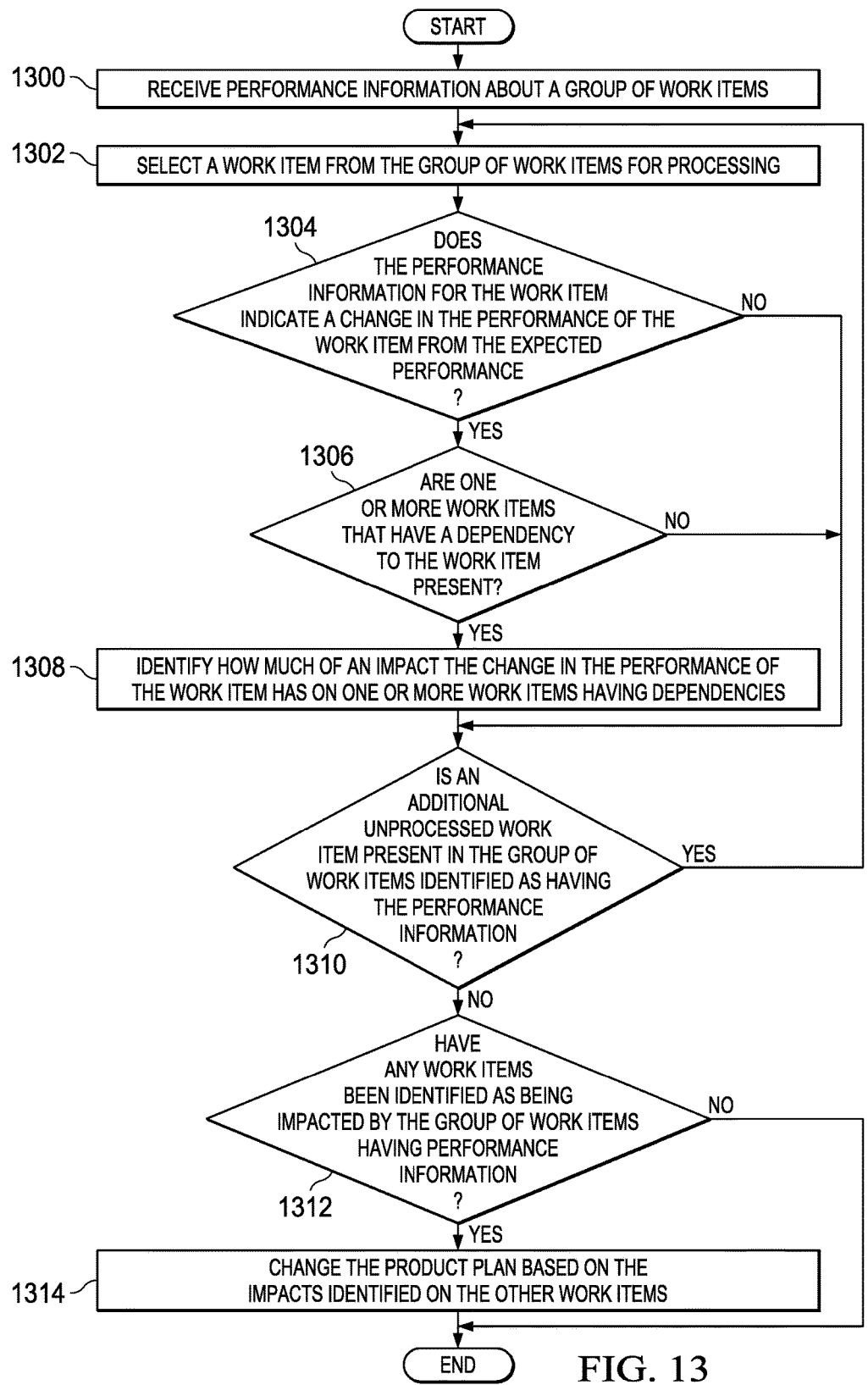
FIG. 13 is an illustration of a flowchart of a process for taking into account dependencies in manufacturing a product using a product plan in accordance with an illustrative embodiment.

With reference next to FIG. 13, an illustration of a flowchart of a process for taking into account dependencies in manufacturing a product using a product plan is depicted in accordance with an illustrative embodiment. The process illustrated in FIG. 13 may be implemented in product manager 110 in FIG. 1.

The process begins by receiving performance information about a group of work items (operation 1300). The process selects a work item from the group of work items for processing (operation 1302). The process determines whether the performance information for the work item indicates a change in the performance of the work item from the expected performance (operation 1304). In this example, operation 1304 may be performed by comparing the expected performance with the actual performance of the work item. The expected performance may have a value or a range of values. For example, the expected performance may be an expected date of completion or a range of dates of completion for the work item. In yet another example, the expected performance may be a level of completion of a work item at a particular date. For example, a brake assembly may be expected to be 75 percent completed by a selected date during production of an aircraft. This level of completion may be needed to perform other work items, such as an inspection of the braking system.

The change indicated by the performance information may be, for example, the work item being performed ahead of schedule or behind schedule, rather than on schedule. Examples of other changes that may be indicated by the performance information include transportation delays, changes in resource availability, process changes, contract changes, and other changes that may have an effect on other work items having dependencies on the work item in which the change has occurred.

If a change in the performance of the work item is present, a determination is made as to whether one or more work items are present that have a dependency to the work item (operation 1306). Operation 1306 identifies other work items that may be affected by the change in the performance of the work item.

If one or more work items are present that do have dependency, the process identifies how much of an impact the change in the performance of the work item has on one or more work items having dependencies (operation 1308). In some cases, there may be no impact on other work items having dependencies. In other cases, the impact may change at least one of when or how other work items are performed.

The process then determines whether an additional unprocessed work item is present in the group of work items identified as having performance information (operation 1310). If an additional unprocessed work item is present, the process returns to operation 1302. Otherwise, the process determines whether any work items have been identified as being impacted by the group of work items having the performance information (operation 1312).

If no work items have been identified, the process terminates. Otherwise, the process changes the product plan based on the impacts identified on the other work items (operation 1314) and terminates thereafter. In this manner, the product plan may be modified to accommodate the changes to the work items with dependencies to the group of work items.

With reference back to operation 1304, if the performance information does not indicate a change in the performance of the work item from the expected performance, the process proceeds to operation 1310 as described above. With reference again to operation 1306, if one or more work items are not present to have a dependency on the work items selected for processing, the process also proceeds to operation 1310.

The flowcharts and block diagrams in the different depicted embodiments illustrate the architecture, functionality, and operation of some possible implementations of apparatuses and methods in an illustrative environment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 14:
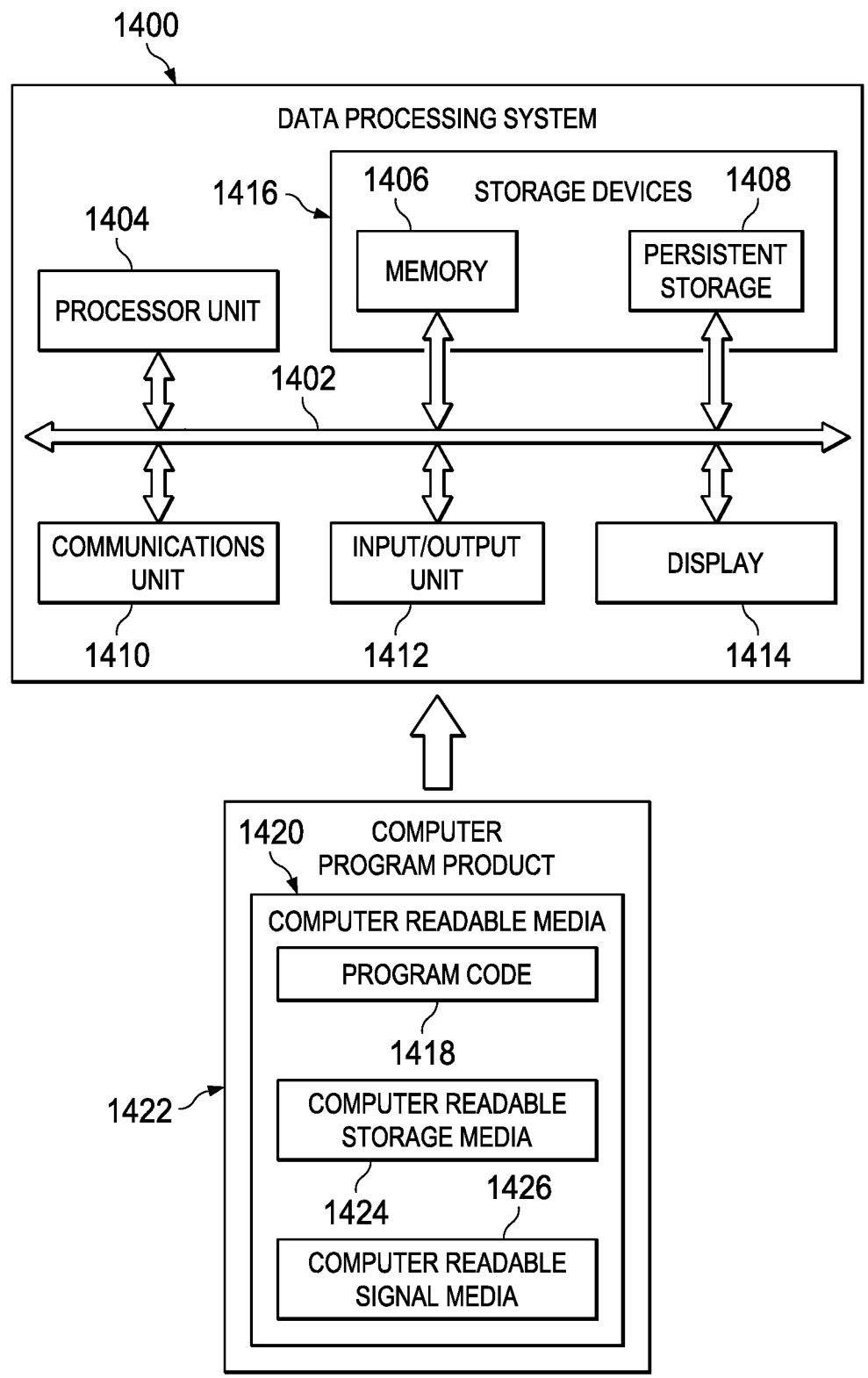
FIG. 14 is an illustration of a block diagram of a data processing system in accordance with an illustrative embodiment.

Turning now to FIG. 14, an illustration of a block diagram of a data processing system is depicted in accordance with an illustrative embodiment. Data processing system 1400 may be used to implement computer system 128 in FIG. 1, computer system 502 in FIG. 5, clients 512 in FIG. 5, and controller 518 in FIG. 5. In this illustrative example, data processing system 1400 includes communications framework 1402, which provides communications between processor unit 1404, memory 1406, persistent storage 1408, communications unit 1410, input/output (I/O) unit 1412, and display 1414. In this example, communications framework 1402 may take the form of a bus system.

Processor unit 1404 serves to execute instructions for software that may be loaded into memory 1406. Processor unit 1404 may be a number of processors, a multi-processor core, or some other type of processor, depending on the particular implementation.

Memory 1406 and persistent storage 1408 are examples of storage devices 1416. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1416 may also be referred to as computer readable storage devices in these illustrative examples. Memory 1406, in these examples, may be, for example, a random access memory or any other suitable volatile or non-volatile storage device. Persistent storage 1408 may take various forms, depending on the particular implementation.

For example, persistent storage 1408 may contain one or more components or devices. For example, persistent storage 1408 may be a hard drive, a solid state hard drive, a flash memory, a rewritable optical disk, a rewritable magnetic tape, or some combination of the above. The media used by persistent storage 1408 also may be removable. For example, a removable hard drive may be used for persistent storage 1408.

Communications unit 1410, in these illustrative examples, provides for communications with other data processing systems or devices. In these illustrative examples, communications unit 1410 is a network interface card.

Input/output unit 1412 allows for input and output of data with other devices that may be connected to data processing system 1400. For example, input/output unit 1412 may provide a connection for user input through at least one of a keyboard, a mouse, or some other suitable input device. Further, input/output unit 1412 may send output to a printer. Display 1414 provides a mechanism to display information to a user.

Instructions for at least one of the operating system, applications, or programs may be located in storage devices 1416, which are in communication with processor unit 1404 through communications framework 1402. The processes of the different embodiments may be performed by processor unit 1404 using computer-implemented instructions, which may be located in a memory, such as memory 1406.

These instructions are referred to as program code, computer usable program code, or computer readable program code that may be read and executed by a processor in processor unit 1404. The program code in the different embodiments may be embodied on different physical or computer readable storage media, such as memory 1406 or persistent storage 1408.

Program code 1418 is located in a functional form on computer readable media 1420 that is selectively removable and may be loaded onto or transferred to data processing system 1400 for execution by processor unit 1404. Program code 1418 and computer readable media 1420 form computer program product 1422 in these illustrative examples. In one example, computer readable media 1420 may be computer readable storage media 1424 or computer readable signal media 1426. In these illustrative examples, computer readable storage media 1424 is a physical or tangible storage device used to store program code 1418, rather than a medium that propagates or transmits program code 1418.

Alternatively, program code 1418 may be transferred to data processing system 1400 using computer readable signal media 1426. Computer readable signal media 1426 may be, for example, a propagated data signal containing program code 1418. For example, computer readable signal media 1426 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1400 are not meant to provide architectural limitations to the manner in which different embodiments may be implemented. The different illustrative embodiments may be implemented in a data processing system including components in addition to or in place of those illustrated for data processing system 1400. Other components shown in FIG. 14 can be varied from the illustrative examples shown. The different embodiments may be implemented using any hardware device or system capable of running program code 1418.

Figure 15:
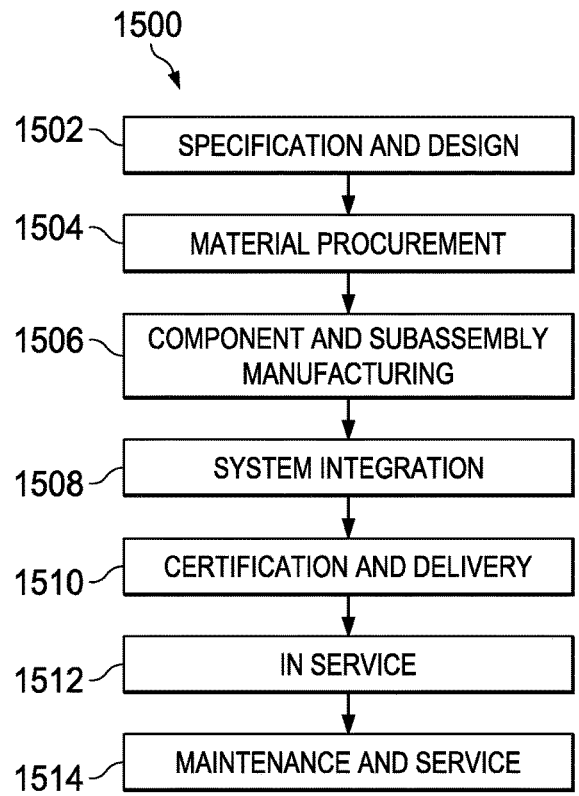
FIG. 15 is an illustration of a block diagram of an aircraft manufacturing and service method in accordance with an illustrative embodiment.
Figure 16:
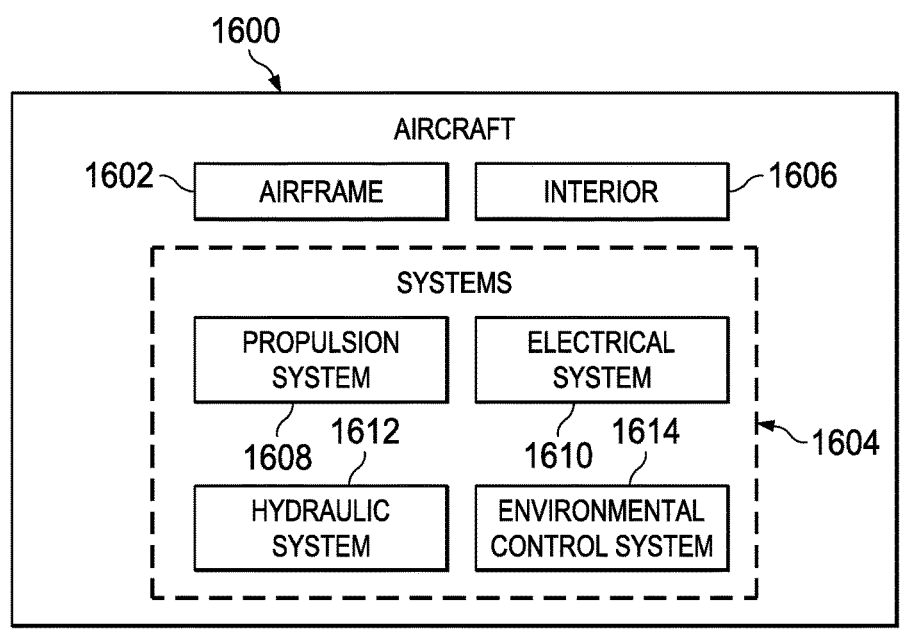
FIG. 16 is an illustration of a block diagram of an aircraft in which an illustrative embodiment may be implemented.

Illustrative embodiments of the disclosure may be described in the context of aircraft manufacturing and service method 1500, as shown in FIG. 15, and aircraft 1600, as shown in FIG. 16. Turning first to FIG. 15, an illustration of a block diagram of an aircraft manufacturing and service method is depicted in accordance with an illustrative embodiment. During pre-production, aircraft manufacturing and service method 1500 may include specification and design 1502 of aircraft 1600 in FIG. 16 and material procurement 1504.

During production, component and subassembly manufacturing 1506 and system integration 1508 of aircraft 1600 takes place. Thereafter, aircraft 1600 may go through certification and delivery 1510 in order to be placed in service 1512. While in service 1512 by a customer, aircraft 1600 is scheduled for routine maintenance and service 1514, which may include modification, reconfiguration, refurbishment, and other maintenance or service.

Each of the processes of aircraft manufacturing and service method 1500 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 16, an illustration of a block diagram of an aircraft is depicted in which an illustrative embodiment may be implemented. In this example, aircraft 1600 is produced by aircraft manufacturing and service method 1500 in FIG. 15 and may include airframe 1602 with plurality of systems 1604 and interior 1606. Examples of systems 1604 include one or more of propulsion system 1608, electrical system 1610, hydraulic system 1612, and environmental control system 1614. Any number of other systems may be included.

Although an aerospace example is shown, different illustrative embodiments may be applied to other industries. For example, other illustrative embodiments may be applied to the automotive industry, the ship building industry, or other suitable industries.

Apparatuses and methods embodied herein may be employed during at least one of the stages of aircraft manufacturing and service method 1500 in FIG. 15. In one illustrative example, components or subassemblies produced in component and subassembly manufacturing 1506 in FIG. 15 may be fabricated or manufactured in a manner similar to components or subassemblies produced while aircraft 1600 is in service 1512 in FIG. 15. As yet another example, one or more apparatus embodiments, method embodiments, or a combination thereof may be utilized during production stages, such as component and subassembly manufacturing 1506 and system integration 1508 in FIG. 15. One or more apparatus embodiments, method embodiments, or a combination thereof may be utilized while aircraft 1600 is in service 1512, during maintenance and service 1514 in FIG. 15, or both.

As another illustrative example, product manager 110 in FIG. 1 may be used to manage manufacturing products, such as systems, assemblies, and parts that may be used during routine maintenance and service 1514 to perform at least one of modification, reconfiguration, refurbishment, or other maintenance or service of aircraft 1600.

The use of a number of the different illustrative embodiments may substantially expedite the assembly of aircraft 1600, reduce the cost of aircraft 1600, or both expedite the assembly of aircraft 1600 and reduce the cost of aircraft 1600. For example, product manager 110 may be used during component and subassembly manufacturing 1506 and system integration 1508 of aircraft 1600 in a manner that increases the speed at which aircraft 1600 may be manufactured. As a result, the number of aircraft manufactured within a particular period of time may be increased.

Figure 17:
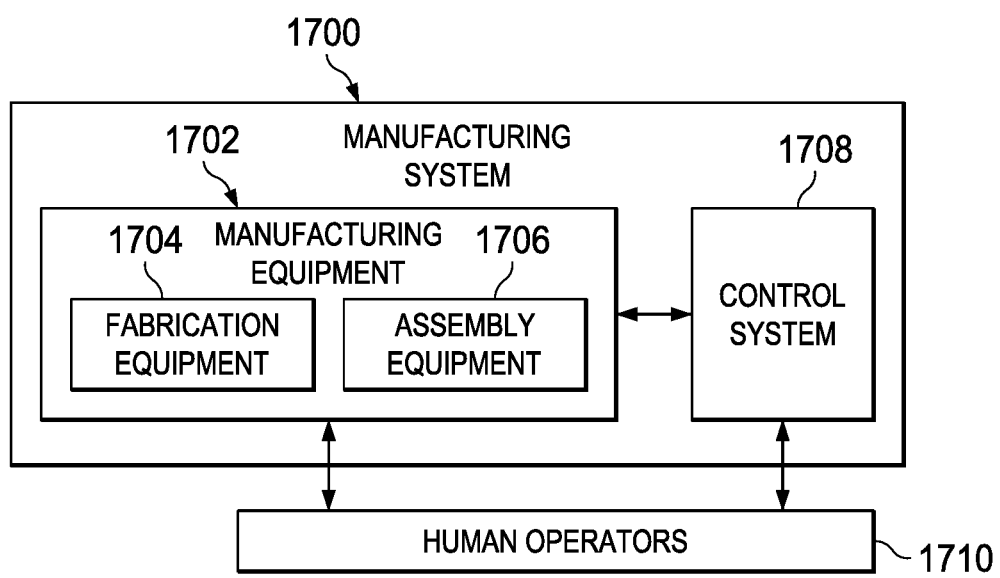
FIG. 17 is an illustration of a block diagram of a manufacturing system in accordance with an illustrative embodiment.

Turning now to FIG. 17, an illustration of a block diagram of a manufacturing system is depicted in accordance with an illustrative embodiment. Manufacturing system 1700 is configured to manufacture products, such as aircraft 106 in FIG. 1 and aircraft 1600 in FIG. 16. As depicted, manufacturing system 1700 includes manufacturing equipment 1702. Manufacturing equipment 1702 includes at least one of fabrication equipment 1704 or assembly equipment 1706.

Fabrication equipment 1704 is equipment that may be used to fabricate components for parts used to form aircraft 106 or aircraft 1600. For example, fabrication equipment 1704 may include machines and tools. These machines and tools may be at least one of a drill, a hydraulic press, a furnace, a mold, a composite tape laying machine, a vacuum system, a lathe, or other suitable types of equipment. Fabrication equipment 1704 may be used to fabricate at least one of metal parts, composite parts, semi-conductors, circuits, fasteners, ribs, skin panels, spars, antennas, or other suitable types of parts.

Assembly equipment 1706 is equipment used to assemble parts to form aircraft 106 or aircraft 1600. In particular, assembly equipment 1706 may be used to assemble components and parts to form aircraft 106 or aircraft 1600. Assembly equipment 1706 also may include machines and tools. These machines and tools may be at least one of a robotic arm, a crawler, a fastener installation system, a rail-based drilling system, or a robot. Assembly equipment 1706 may be used to assemble parts such as seats, horizontal stabilizers, wings, engines, engine housings, landing gear systems, and other parts for aircraft 106 and aircraft 1600.

Manufacturing system 1700 also includes control system 1708. Control system 1708 is a hardware system and may also include software or other types of components. Control system 1708 is configured to control the operation of manufacturing system 1700. In particular, control system 1708 may control the operation of at least one of fabrication equipment 1704 or assembly equipment 1706.

The hardware in control system 1708 may be using hardware that may include computers, circuits, networks, and other types of equipment. The control may take the form of direct control of manufacturing equipment 1702. For example, robots, computer-controlled machines, and other equipment may be controlled by control system 1708. In other illustrative examples, control system 1708 may manage operations performed by human operators 1710 in manufacturing aircraft 106 or aircraft 1600. For example, control system 1708 may assign tasks, provide instructions, display models, or perform other operations to manage operations performed by human operators 1710. In these illustrative examples, product manager 110 in FIG. 1 may be implemented in control system 1708 to manage at least one of the manufacturing of aircraft 106 or aircraft 1600 in FIG. 16.

In the different illustrative examples, human operators 1710 may operate or interact with at least one of manufacturing equipment 1702 or control system 1708. This interaction may be performed to manufacture aircraft 106 or aircraft 1600.

Manufacturing system 1700 may be configured to manufacture other products other than aircraft 106 or aircraft 1600. Although aircraft manufacturing system 1700 has been described with respect to manufacturing in the aerospace industry, manufacturing system 1700 may be configured to manufacture products for other industries. For example, manufacturing system 1700 may be configured to manufacture products for the automotive industry, spacecraft industry, ship building industry, as well as any other suitable types of industries.

Thus, one or more of the illustrative examples provide one or more technical solutions to overcome a technical problem with managing the manufacturing of an aircraft. For example, as shown in FIG. 1, product manager 110 provides access to information in at least one of product plan 108 or product workflow map 132 in a manner that allows for entities 118 to perform work on work items 122 to manufacture product 102.

Further, product manager 110 provides an ability to make product plan 108 and product workflow map 132 dynamic. In other words, at least one of product plan 108 or product workflow map 132 may change during the manufacturing of product 102 in a manner that may reduce delays in the manufacturing of product 102, as compared to manufacturing product 102 without product manager 110. Additionally, one or more illustrative examples provide one or more technical solutions that overcome a problem with confidential information being present in information 300 in FIG. 3 in at least one of product plan 108 or product workflow map 132.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A product management system that comprises:
   a product plan that comprises:
      phases of a manufacturing that comprise time units that comprise manufacturing of a product;
      entities performing work on systems for the product; and
      work items performed by the entities during the time units; and
   a product manager, in a computer system, specially programmed to:

automate, responsive to receipt of performance information that affects a timing of a workflow, changes to work item formation by the product plan; and manufacture the product per the changes, via a controller configured to generate a change a daily production schedule and control manufacturing equipment.

2. The product management system of claim 1, further comprising the product manager configured to control at least one of: dependencies, or durations, of workflows in the manufacturing of the product using the product plan.

3. The product management system of claim 1, further comprising a product workflow map specially programmed to display the product plan, such that the product workflow map comprises:

divisions, parallel to a first axis of the product workflow map, that represent the time units during which the manufacturing of the product occurs;

segments that represent the systems for the product and comprise a distance along the first axis, and extend perpendicular to the first axis and across the divisions, each segment in the segments configured for presentation only to entities with an access right to that segment;

the phases of the manufacturing that comprise a distance along a second axis, perpendicular to the first axis, that comprise groups of the divisions; and workflows displayed, along the second axis in a branched line that comprises branches that represent work items across the divisions, the workflows configured for selection to produce a second display that comprises dependencies between work items, the second display configured for selection of a third display that comprises additional details for a work item in the work items.

4. The product management system of claim 3, further comprising the product manager specially programmed to display the product workflow map on a display system to a group of the entities.

5. The product management system of claim 3, further comprising a portion of the product workflow map that comprises information for an entity, in the entities, to perform the work on a group of the work items assigned to the entity and an access to a display of that portion assigned to the entity.

6. The product management system of claim 5, wherein the product workflow map further comprises assignment indicators indicating an assignment of the group of the work items to the entity.

7. The product management system of claim 1, further comprising the product manager specially programmed to identify, based upon a policy, information for a portion of a product workflow map displayed on a display system to an entity.

8. The product management system of claim 1, wherein the product plan further comprises dependencies between at least one of: the work items or workflows, that identify an order of performance of the work items.

9. The product management system of claim 8, further comprising the product manager specially programmed to receive performance information about that affects a dependency in the dependencies.

10. The product management system of claim 1, further comprising the performance information comprising a cause for a change to at least one of: a group of workflows, or a group of the work items, in the product plan.

11. The product management system of claim 10, further comprising the performance information selected from at least one of: a change in a part delivery date, a delay in completing a work item, an availability of parts, a revision to the work item, or a rework performed.

12. The product management system of claim 10, further comprising the product manager specially programmed to at least one of: change a flow of the work items, add the work item, remove the work item, or reassign the work item to another entity.

13. The product management system of claim 1, further comprising the entities selected from at least one of: a supplier, a manufacturer, a design department, an engineering group, a person, or an installation team.

14. The product management system of claim 1, wherein the product is selected from one of a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a bridge, a dam, a house, a manufacturing facility, and a building.

15. A method for manufacturing a product, the method comprising:

a product manager in a computer system creating a product plan comprising phases of the manufacturing comprising time units comprising manufacturing of the product;

the time units comprising:

entities performing work on systems for the product; and work items performed by the entities during the time units;

automating, responsive to the product manager receiving performance information affecting a timing of a workflow, forming changes to the work items in the product plan; and controlling equipment manufacturing the product using the product plan via a controller changing a daily production schedule.

16. The method of claim 15, further comprising the product manager creating a product workflow map from the product plan, the product workflow map comprising:

divisions, parallel to a first axis of the product workflow map, representing the time units during which the manufacturing of the product occurs;

segments, representing the systems for the product and comprising a distance along the first axis, extending, perpendicular to the first axis, across the divisions, each segment in the segments configured for presentation only to entities with an access right to that segment;

the phases of the manufacturing comprising a distance along a second axis, perpendicular to the first axis, representing groups of the divisions; and displays, along the second axis in a branched line that comprises branches that represent work items, of workflows across the divisions, enabling a display of the product workflow map on a display system, the workflows configured for selection to produce a second display that comprises dependencies between work items, the second display configured for selection of a third display that comprises additional details for a work item in the work items.

17. The method of claim 16, further comprising the product manager specially programmed with a policy that control displaying the product workflow map on the display system to a group of the entities comprising an access compliant with the policy.

18. The method of claim 16, further comprising displaying a portion of the product workflow map on the display system to an entity in the entities, the portion including information used by the entity for performing the work on a group of the work items assigned to the entity.

19. The method of claim 18, further comprising the product workflow map further comprising assignment indicators indicating an assignment of the group of the work items to the entity.

20. The method of claim 15, further comprising the product manager identifying information for a portion of a product workflow map displayed on a display system to an entity using a policy.

21. The method of claim 15, further comprising the product plan comprising: dependencies between the work items, and workflows identifying an order for performing the work items.

22. The method of claim 15, further comprising a product manager receiving performance information about the manufacturing of the product during each time unit of the manufacturing of the product and, responsive to performance information affecting the timing of the workflow, changing the product plan during each time unit of the manufacturing of the product.

23. The method of claim 15, further comprising the product manager changing at least one of: a group of workflows, or a group of the work items, in the product plan using performance information.

24. The method of claim 23, further comprising the product manager selecting the performance information from at least one of: a change in a part delivery date, a delay in completing a work item, an availability of parts, a revision to the work item, or a rework performed.

25. The method of claim 23, further comprising the product manager specially programmed for at least one of: changing a flow of the work items, adding a work item, removing the work item, or reassigning the work item to another entity.

26. The method of claim 15, further comprising assigning the work items the entities selected from at least one of: a supplier, a manufacturer, a design department, an engineering group, an inspection department, a person, or an installation team.

27. The method of claim 15, further comprising selecting the product from one of: a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a bridge, a dam, a house, a manufacturing facility, and a building.

28. A product management system that comprises:
a manufacturing system that comprises a product plan that comprises:
phases of the manufacturing that comprise-manufacturing days during which manufacturing of a product occurs;
entities performing work on systems for the product;
work items performed by the entities during the manufacturing days;
dependencies between the work items; and
workflows identifying an order in which the work items are performed;
a display system; and
a product manager in a computer system, the product manager controlling equipment manufacturing the product via a controller responsive to the product plan;
display a product workflow map on the display system;
automate a change to the product plan responsive to receipt of performance information during the manufacturing of the product that affects timing of the workflows; and
display, responsive to the change to the product plan, an updated product workflow map during the manufacturing of the product.

29. The product management system of claim 28, further comprising the product manager configured to create the product workflow map from the product plan, the product workflow map configured for presentation on a display that comprises:
divisions, parallel to a first axis of the product workflow map, that represent the manufacturing days that comprise manufacturing of the product;
segments that represent the systems for the product and comprise a distance along the first axis, and extend perpendicular to the first axis and across the divisions, each segment in the segments configured for presentation only to entities with an access right to that segment;
phases of the manufacturing that comprise a distance along a second axis, perpendicular to the first axis, that comprise groups of the divisions; and
the workflows displayed, along the second axis in a branched line that comprises branches that represent work items across the divisions, the workflows configured for selection to produce a second display that comprises dependencies between work items, the second display configured for selection of a third display that comprises additional details for a work item in the work items.

* * * * *